US010691954B2

(12) United States Patent
Beals et al.

(10) Patent No.: US 10,691,954 B2
(45) Date of Patent: Jun. 23, 2020

(54) WIDE AREA PARKING SPOT IDENTIFICATION

(71) Applicant: DISH Network L.L.C., Englewood, CO (US)

(72) Inventors: William Michael Beals, Englewood, CO (US); Karam J. Saab, Denver, CO (US)

(73) Assignee: DISK Network L.L.C., Englewood, CO (US)

( * ) Notice: Subject to any disclaimer, the term of this patent is extended or adjusted under 35 U.S.C. 154(b) by 180 days.

(21) Appl. No.: 15/792,482

(22) Filed: Oct. 24, 2017

(65) Prior Publication Data

US 2019/0122050 A1    Apr. 25, 2019

(51) Int. Cl.
*G06K 9/00* (2006.01)
*G08G 1/14* (2006.01)
(Continued)

(52) U.S. Cl.
CPC ......... *G06K 9/00771* (2013.01); *G06K 9/209* (2013.01); *G06K 9/344* (2013.01); *G06T 7/80* (2017.01); *G08G 1/04* (2013.01); *G08G 1/14* (2013.01); *G08G 1/142* (2013.01); *G08G 1/144* (2013.01); *G08G 1/146* (2013.01); *G06K 2209/01* (2013.01); *G06K 2209/21* (2013.01); *G06T 2207/30232* (2013.01); *G06T 2207/30264* (2013.01)

(58) Field of Classification Search
None
See application file for complete search history.

(56) References Cited

U.S. PATENT DOCUMENTS

| 8,102,799 B2 | 1/2012 | Alexander et al. |
| 8,816,879 B2 | 8/2014 | Stefik et al. |

(Continued)

FOREIGN PATENT DOCUMENTS

| WO | 03/029046 A1 | 4/2003 | |
| WO | WO-03029046 A1 * | 4/2003 | ............... G08G 1/14 |

(Continued)

OTHER PUBLICATIONS

International Search Report and Written Opinion for PCT/US2018/052430 dated Jan. 15, 2019, all pages.

(Continued)

*Primary Examiner* — Lindsay J Uhl
(74) *Attorney, Agent, or Firm* — Kilpatrick Townsend & Stockton LLP

(57) ABSTRACT

Embodiments detailed herein can include performing an initial calibration that maps each optical character of the plurality of optical characters visible in a field-of-view of a digital camera of a wide-area parking space monitoring system with corresponding parking spaces. The digital camera of the system may capture an image facing downward toward the parking spaces. The system may identify one or more optical characters that are visible within the image. The system may determine one or more parking spaces of the plurality of parking spaces that are mapped to the identified one or more optical characters, The system may output an indication of the determined one or more parking spaces that indicates the one or more parking spaces are available.

18 Claims, 6 Drawing Sheets

(51) Int. Cl.
*G06K 9/34* (2006.01)
*G06K 9/20* (2006.01)
*G06T 7/80* (2017.01)
*G08G 1/04* (2006.01)

(56) References Cited

U.S. PATENT DOCUMENTS

| | | |
|---|---|---|
| 10,104,454 B2 | 10/2018 | Sullivan et al. |
| 2005/0280555 A1 | 12/2005 | Warner |
| 2006/0136131 A1 | 6/2006 | Dugan et al. |
| 2007/0050240 A1 | 3/2007 | Belani et al. |
| 2008/0129544 A1* | 6/2008 | Augst ............. B62D 15/027 340/932.2 |
| 2011/0163894 A1 | 7/2011 | Grievink et al. |
| 2013/0073350 A1 | 3/2013 | Blustein |
| 2014/0072178 A1 | 3/2014 | Carbonell et al. |
| 2014/0343891 A1 | 11/2014 | Becker et al. |
| 2016/0292808 A1 | 10/2016 | Blandin et al. |
| 2017/0025008 A1* | 1/2017 | Gignac ............. G08G 1/143 |
| 2017/0092130 A1 | 3/2017 | Bostick et al. |
| 2017/0098374 A1 | 4/2017 | Sullivan et al. |
| 2018/0286237 A1* | 10/2018 | Hu ............. G08G 1/133 |
| 2019/0014392 A1 | 1/2019 | Sullivan et al. |

FOREIGN PATENT DOCUMENTS

| | | | |
|---|---|---|---|
| WO | 2009/079779 A1 | 7/2009 | |
| WO | WO-2009079779 A1 * | 7/2009 | ............. G08G 1/04 |

OTHER PUBLICATIONS

U.S. Appl. No. 15/286,429, filed Oct. 5, 2016 dated Jun. 28, 2018, all pages.
U.S. Appl. No. 16/109,924, filed Aug. 23, 2018 Non-Final Rejection dated Apr. 18, 2019, all pages.
U.S. Appl. No. 15/286,429, filed Oct. 5, 2016 Non-Final Rejection dated Aug. 24, 2017, all pages.
U.S. Appl. No. 15/286,429, filed Oct. 5, 2016 Final Rejection dated Feb. 15, 2018, all pages.
U.S. Appl. No. 16/109,924, filed Aug. 23, 2018 Notice of Allowance dated Aug. 7, 2019, all pages.
International Search Report and Written Opinion for PCT/US2019/044593 dated Oct. 23, 2019, all pages.

* cited by examiner

WIDE AREA PARKING SPOT IDENTIFICATION

BACKGROUND

Searching for a parking space can be an annoying endeavor. Typically, a driver cruises through a parking lot's aisles scanning from side-to-side for an open space until she finds one. While systems exist to identify open parking spaces, such systems typical require sensor hardware to be installed for each individual parking space. Installing such separate sensor hardware for individual parking spaces can be costly and expensive to maintain.

SUMMARY

Various embodiments are described related to a wide-area parking space monitoring. In some embodiments, a system for wide-area parking space monitoring is described. The system may include a digital camera mounted to a raised structure, the digital camera can have a field-of-view facing downward toward a plurality of parking spaces. The system may include a plurality of optical characters. Each optical character of the plurality of optical characters may be positioned within a corresponding parking space of the plurality of parking spaces. The system may include one or more processors. The system may include a memory communicatively coupled with and readable by the one or more processors and having stored therein processor-readable instructions which, when executed by the one or more processors, may cause the one or more processors to perform an initial calibration that maps each optical character of the plurality of optical characters visible in the field-of-view of the digital camera with the corresponding parking space of the plurality of parking spaces. The one or more processors may capture, via the digital camera mounted with the outdoor light, an image facing downward toward the plurality of parking spaces. The one or more processors may identify one or more optical characters that are visible within the image. The one or more processors may determine one or more parking spaces of the plurality of parking spaces that are mapped to the identified one or more optical characters. The one or more processors may output an indication of the determined one or more parking spaces that indicates the one or more parking spaces are available.

Embodiments of such a system may include one or more of the following features: Some of the optical characters of the plurality of optical characters may differ from other optical characters of the plurality of optical characters. The processor-readable instructions, when executed by the one or more processors, may further cause the one or more processors to create a unique identifier for each parking space of the plurality of parking spaces at least partially based on plurality of optical characters. The system may further include a housing. The housing may house the digital camera, the memory, and the one or more processors. The system may include a wireless network interface. The processor-readable instructions that cause the one or more processors to output the indication of the determined one or more parking spaces may include processor-readable instructions configured to cause the one or more processors to transmit, via the wireless network interface, an identifier that corresponds to each parking space of the determined one or more parking spaces. The wireless network interface may communicate with a remote server system via a narrowband Internet of Things (NB-IoT) network. The system may include a directional illumination device. The processor-readable instructions that cause the one or more processors to output the indication of the determined one or more parking spaces may include processor-readable instructions configured to cause the one or more processors to cause the directional illumination device to project an image a distance from each parking space of the determined one or more parking spaces. The memory and one or more processors may be part of a remote server that is remotely located from the digital camera. The system may further include a plurality of digital cameras comprising the digital camera. Each digital camera of the plurality of digital cameras may be mounted with a different raised structure. The one or more processors may analyze images captured by each camera of the plurality of digital cameras. The plurality of optical characters may be offset from centers of the plurality of the parking spaces based on an angle of a line-of-sight from the digital camera to the corresponding parking space.

In some embodiments, a device for monitoring a wide-area parking space is described. The device may include a housing mounted to a raised structure. The device may include a digital camera, housed by the housing, the digital camera having a field-of-view facing downward toward a plurality of parking spaces. The plurality of parking spaces may be a plurality of optical characters. The device may include one or more processors housed by the housing. The device may include a memory, housed by the housing, communicatively coupled with and readable by the one or more processors and having stored therein processor-readable instructions which, when executed by the one or more processors, may cause the one or more processors to perform an initial calibration that maps each optical character of the plurality of optical characters visible in the field-of-view of the digital camera with the corresponding parking space of the plurality of parking spaces. The one or more processors may capture, via the digital camera, an image facing downward toward the plurality of parking spaces. The one or more processors may identify one or more optical characters that are visible within the image. The one or more processors may determine one or more parking spaces of the plurality of parking spaces that are mapped to the identified one or more optical characters. The one or more processors may output an indication of the determined one or more parking spaces that indicates the one or more parking spaces are available.

Embodiments of such a device may include one or more of the following features: Some of the optical characters of the plurality of optical characters may differ from other optical characters of the plurality of optical characters. The processor-readable instructions, when executed by the one or more processors, may further cause the one or more processors to create a unique identifier for each parking space of the plurality of parking spaces at least partially based on a plurality of optical characters. The device may further include a wireless network interface housed within the housing. The processor-readable instructions that cause the one or more processors to output the indication of the determined one or more parking spaces may include processor-readable instructions configured to cause the one or more processors to transmit, via the wireless network interface, an identifier that corresponds to each parking space of the determined one or more parking spaces.

In some embodiments, a method for using a wide-area parking space monitoring system is described. The method may include performing, by the wide-area parking space monitoring system, an initial calibration that maps each optical character of a plurality of optical characters visible in a field-of-view of a digital camera of the wide-area parking space monitoring system with the corresponding parking space of a plurality of parking spaces. The method may include capturing, via the digital camera of the wide-area parking space monitoring system, an image facing downward toward the plurality of parking spaces. The method may include identifying, by the wide-area parking space monitoring system, one or more optical characters that are visible within the image. The method may include determining, by the wide-area parking space monitoring system, one or more parking spaces of the plurality of parking spaces that are mapped to the identified one or more optical characters. The method may include outputting, by the wide-area parking space monitoring system, an indication of the determined one or more parking spaces that indicates the one or more parking spaces are available.

Embodiments of such a method may include one or more of the following features: The method may include installing the plurality of in-space optical characters such that an offset of each optical character of the plurality of optical characters may be based on an angle of a line-of-sight from the digital camera to the corresponding parking space. The offset may be from a center of the corresponding parking space. The method may include creating a unique identifier for each parking space of the plurality of parking spaces at least partially based on a plurality of optical characters. The method may include transmitting, by the wide-area parking space monitoring system via a wireless network interface, an identifier that corresponds to each parking space of the determined one or more parking spaces. The wireless network interface may communicate with a remote server system via a narrowband Internet of Things (NB-IoT) network. The method may include causing a directional illumination device to project an image a distance from each parking space of the determined one or more parking spaces.

DETAILED DESCRIPTION

A parking space monitoring system may use a digital camera mounted in a position such that the field-of-view of the camera captures multiple parking spaces (e.g., within a parking lot, of on-street parking, in some other parking region). In some embodiments, a digital camera may be mounted to a parking lot light pole, streetlight pole, or other raised structure. An advantage of using a parking lot light pole or streetlight pole is that a source of light is provided for illuminating the parking spaces at night. By mounting the digital camera to such a raised structure, a significant number (e.g., dozens) of parking spaces may be monitored using the single digital camera.

The digital camera may be in communication with a processing system that can perform optical character recognition (or shape recognition). An easily recognizable and distinguishable shape or character may be painted or otherwise displayed within each parking space to be monitored within the field-of-view of the digital camera. When an optical character recognition (OCR) engine of the processing system successfully reads the character present within the parking space, the parking space is determined to be available. When an optical character recognition (OCR) engine of the processing system cannot read the character present on the parking space, the parking space is determined to be occupied or otherwise unavailable.

Such arrangements can then be used to inform drivers of where available parking spaces are located. In some embodiments, available parking space information is sent to an electronic display sign for presentation. In some embodiments, parking space information is sent to a mobile device of a driver or passenger for presentation. Additionally or alternatively, a directional illumination device may be used to emphasize open parking spaces. Such an illumination device may project an image onto the ground that indicates the location of an available parking space. For example, such an image may be projected into an aisle of a parking lot to make an available parking space readily apparent without a driver needing to drive down the aisle.

Figure 1A:
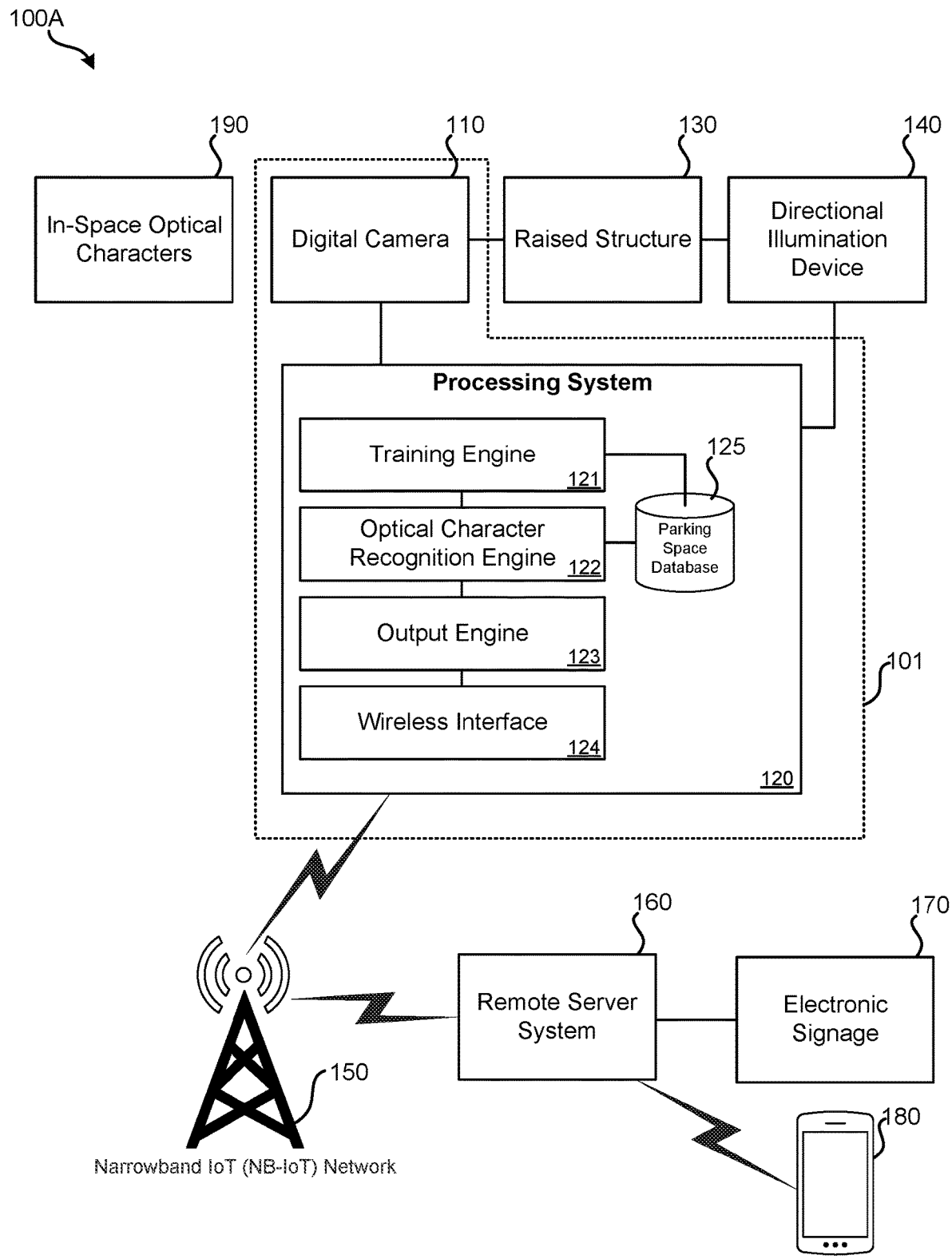
FIG. 1A illustrates a block diagram of a wide-area parking space identification system that utilizes a narrowband internet of things (NB-IoT) wireless network.

Further detail regarding the embodiments is provided in relation to the figures. FIG. 1A illustrates a block diagram of a wide-area parking space identification system 100A that utilizes a narrowband internet of things (NB-IoT) wireless network. System 100A can include: digital camera 110, processing system 120, raised structure 130, directional illumination device 140, NB-IoT network 150, remote server system 160, electronic signage 170, wireless computerized device 180, and in-space optical characters 190.

In system 100A, digital camera 110 may be incorporated with processing system 120 as a single device within housing 101. As such, a single device that can be mounted in raised structure 130 may perform image capture and image analysis. Digital camera 110 may be color or black and white digital still or video camera that periodically captures images. Digital camera 110 may be mounted to raised structure 130 such that the field-of-view of digital camera 110 faces downwards towards a plurality of parking spaces. Digital camera 110 may output images to processing system 120 for analysis.

Digital camera 110 may be mounted to raised structure 130. Raised structure may be any fixed structure that allows digital camera 110 to have its field-of-view include multiple parking spaces and view optical characters present on the ground within the parking space. In some embodiments, raised structure 130 is a parking lot light pole, streetlight, pole, or edge of a building. Such structures have an added advantage of typically also supporting one or more lights that serve to illuminate the parking spaces. Such light can help digital camera 110 capture images at night. Digital camera 110 may be fixed near the top of raised structure 130 such that as many parking spaces are visible within the camera's field-of-view as possible.

Processing system 120 may include various components found in a general-purpose computing system, such as one or more processors, one or more non-transitory processor-readable mediums (e.g., RAM, ROM, hard drives), a communication bus, and various input and output interfaces. Processing system 120 may have one or more specialized processors or general-purpose processors that are configured to execute stored instructions that realize various functions. Such functions of processing system 120 may include: training engine 121, optical character recognition (OCR) engine 122, output engine 123, and parking space database 125.

Training engine 121 may be used to initially configure OCR engine 122. Such training may include defining the parking spaces through which OCR engine 122 will monitor by searching for a particular readable optical character. Such training may also include linking a unique identifier to each parking space within the field of view of digital camera 110. Further detail regarding the initial training performed using training engine 121 is provided in relation to method 400 of FIG. 4.

OCR engine 122 may be trained to recognize one or more in-space optical characters 190 that are painted or otherwise present on the ground within multiple parking spaces. Such optical characters may be a "+" (plus sign) or other easily recognizable and distinguishable optical character. Use of OCR engine 122 may be particularly effective since many OCR software engines are readily available to perform recognition of characters. By implementing such an OCR engine on an image for a parking space analysis, a parking space monitoring system can be implemented for a low cost with minimal hardware. When OCR engine 122 identifies an optical character within a parking space, the parking space is identified as available. When OCR engine 122 cannot identify the optical character within the parking space, the parking space is identified as unavailable or occupied. OCR engine 122 may be trained to recognize multiple different optical characters. Use of multiple different optical characters may help training engine 121 and OCR engine 122 distinguish parking spaces from each other and/or assigned unique identifiers to each parking space.

Parking space database 125 may be created by training engine 121 and accessed by OCR engine 122. Parking space database 125 may relate each optical character of in-space optical characters 190 with a particular parking space having a unique identifier. As such, when OCR engine 122 identifies a readable optical character within a parking space, parking space database 125 can be accessed to determine the unique identifier associated with that particular parking space. Parking space database 125 may link particular portions of images captured by digital camera 110 with a particular parking space and identifier. For instance, if a readable optical character is identified within a particular region of a captured digital image from digital camera 110, data from parking space database 125 can be used to identify the particular parking space identifier mapped to this particular region of the captured digital image.

Output engine 123 may serve to output indications of available and/or unavailable parking spaces to a separate computerized device. Output engine 123 may interface with a wireless interface 124 to cause data indicative of the available and/or unavailable parking spaces to be transmitted to a remote computerized device via a wireless communication network. In some embodiments, wireless interface 124 communicates with a NB-IoT network 150. Such a wireless network may have a low bandwidth, such as 1 Mbit/s or less. As such, it may be difficult to periodically transmit digital images captured by digital camera 110. Rather, only the identifiers of parking spaces identified as available (or, possibly unavailable) may be transmitted via NB-IoT network 150. By only transmitting an identifier linked with the parking space, rather than an image, the amount of data transmitted by wireless interface 124 to remote server system 160 may be greatly reduced.

Remote server system 160 may serve to distribute information regarding available and unavailable parking spaces. Remote server system 160 may analyze the data received indicative of the available and unavailable parking spaces and may cause a message to be presented using electronic signage 170. For instance, remote server system 160 may cause electronic signage 170 to display a message indicative of a row within a parking lot that has several available parking spaces. In some embodiments, remote server system 160 may trigger electronic signage 172 present an identifier of a particular parking space that is available. Remote server system 160 may also interface with various wireless computerized devices 180. A wireless computerized device may be a smart phone, laptop, or some other form of computerized device that can request or receive information from remote server system 160, such as via a cellular network. Via such a wireless computerized device, a user can view information regarding available and unavailable parking spaces.

In some embodiments, indications of available and/or unavailable parking spaces may be presented directly within the parking lot or parking region (e.g., on-street parking) by projecting light using directional illumination device 140. Directional illumination device 140 may project light onto the ground in order to emphasize available parking spaces. For instance, directional illumination device 140 may project light into an aisle of a parking lot indicative of one or more parking spaces within the aisle being available. The locations to which the directional illumination device projects light may be based on indications of locations provided by processing system 120. Directional illumination device 140 may also be mounted to raised structure 130. In some embodiments, directional illumination device 140 is incorporated within housing 101 or may be distinct from the device housing digital camera 110 and processing system 120. Directional illumination device 140 may utilize a spotlight, laser, or other lighting source that can be pointed in a particular direction and provide localized lighting.

In-space optical characters 190 may be painted or otherwise present within each parking space to be monitored using digital camera 110. Such in-space optical characters 190 may be sized in order to be easily visible via digital camera 110 that may be positioned within each parking space such that when a vehicle is present in the parking space, the line-of-sight from digital camera 110 to the in-space optical character is blocked. Typically, by positioning each in-space optical character in a center of each parking space, the presence of a vehicle will mostly block the line-of-sight between the optical character and digital camera 100.

Figure 1B:
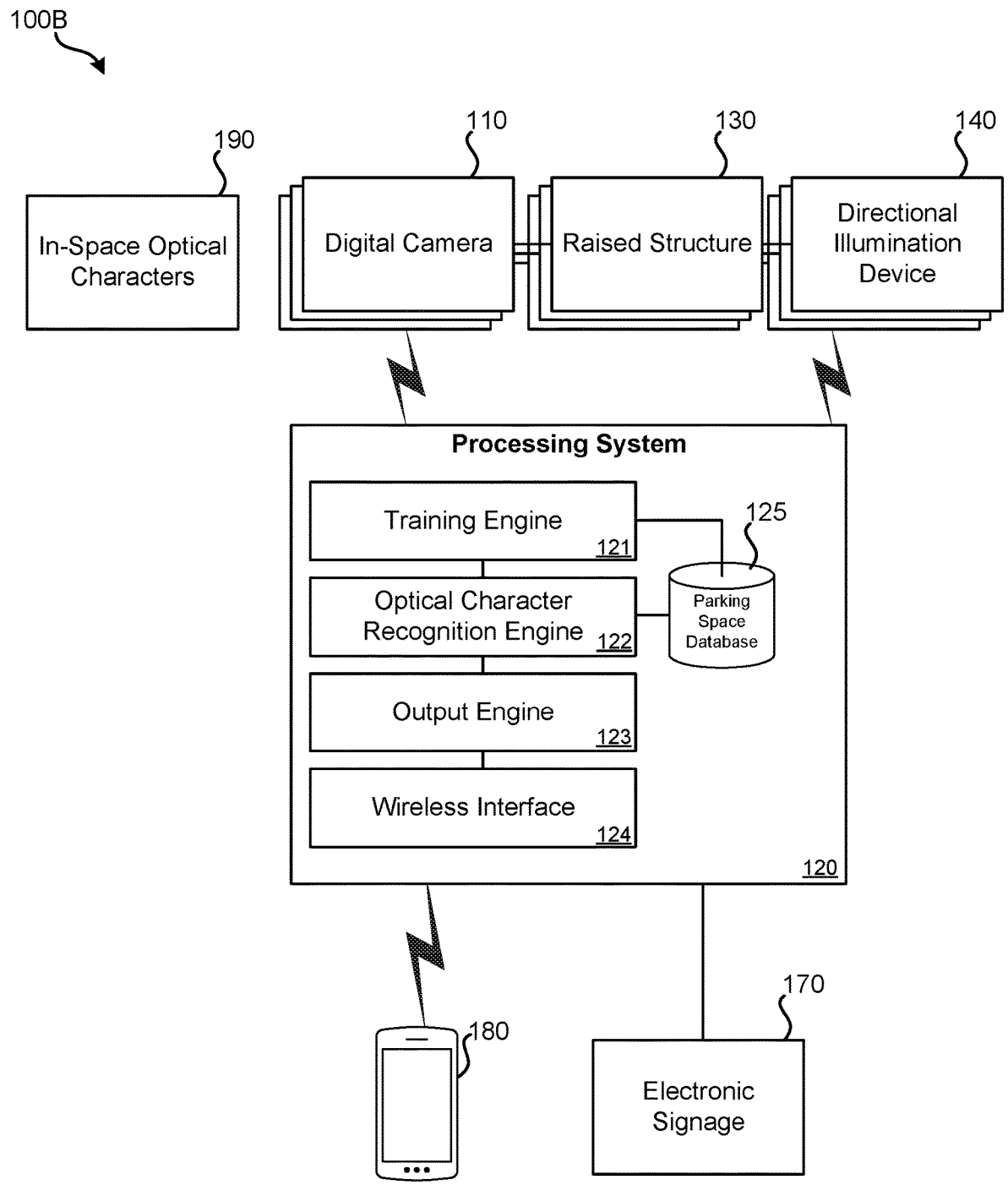
FIG. 1B illustrates a block diagram of a wide-area parking space identification system that utilizes processing remote from the digital camera to identify available parking spaces.

FIG. 1B illustrates a block diagram of a wide-area parking space identification system 100B that utilizes processing remote from the digital camera to identify available parking spaces. In system 100B, rather than the processing being performed locally at a device housing the digital camera and processing system, processing system 120 is remote from digital camera 110. By processing system 120 being remote, such as incorporated as part of remote server system 160, images are transmitted from digital camera 110 to processing system 120. A network with sufficient bandwidth to transmit images, such as a wired or IEEE 802.11 (e.g., Wi-Fi®) based network, may be used. Processing system 120 may communicate wirelessly, such as using a NB-IoT network or IEEE 802.11 based network with directional illumination devices 140, if present, to emphasize available parking spaces associated with the various digital cameras 110. Communication with a wireless computerized device 180 may be performed using a cellular network or IEEE 802.11 based network.

Such an arrangement of system 100B may facilitate processing system 120 performing image analysis from multiple different digital cameras. Therefore, multiple digital cameras 110 may be attached to various different raised structures 130 in different locations. Processing system 120 may analyze images received from each of digital cameras 110 to identify various available or unavailable parking spaces. Such an arrangement can allow a single processing system 120 to process images from multiple digital cameras, thus decreasing the total amount of required hardware. The remaining components of system 100B may function similarly to the corresponding components of system 100A.

Figure 2:
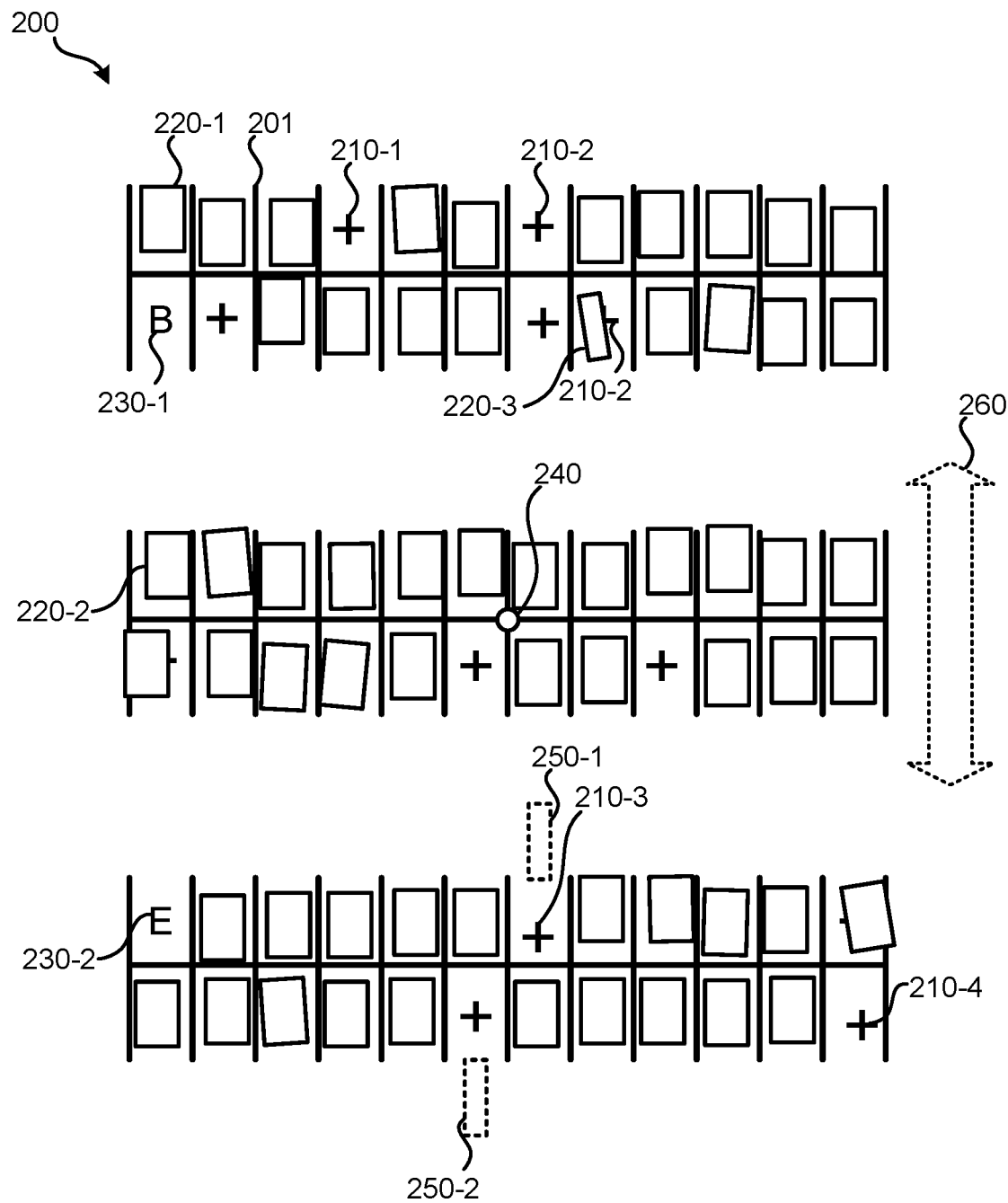
FIG. 2 illustrates a top view of a parking lot monitored by a wide-area parking space identification system.

FIG. 2 illustrates a top view of a parking lot 200 monitored by a wide-area parking space identification system. Such a system may be system 100A or 100B of FIGS. 1A and 1B, respectively. Digital camera 110 (which may be within housing 101) may be mounted to light pole 240 such that a field-of-view of the digital camera is as illustrated in FIG. 2. From this viewpoint, six rows of parking spaces 201 are visible. Many of parking spaces 201 are filled by vehicles 220. For simplicity of FIG. 2, only vehicles 220-1, 220-2, and 220-3 are labeled. As with typical drivers, vehicles 220 are parked at different angles and positions within parking spaces 201.

Within the illustrated field of view of the digital camera, vehicles 220 obscure in-space optical characters. In available parking spaces, in-space optical characters 210 are visible to the digital camera. Therefore, the digital camera may recognize in-space optical character 210-1 and in-space optical character 210-2. Other in-space optical characters that are visible are not labeled for simplicity of FIG. 2. By virtue of a processing system in communication with the digital camera recognizing in-space optical character 210-1, this means the parking space in which in-space optical character 210-1 is located is available.

While in some embodiments all in-space optical characters may be the same (e.g., all "+" signs), in some embodiments, at least some of the in-space optical characters may differ. The use of varying optical characters may help the processing system identify the particular parking space with which the optical character is mapped or may help in initial learning process during which unique identifiers are assigned to each parking space. For instance, in-space optical character 230-1 is the letter "B". This letter may serve as an in-space optical character for determining if a vehicle is occupying the parking space and may also serve as a parking lot row identifier. For instance, the parking space to the right of the parking space having in-space optical character 230-1 may be identified as parking space "B2". Each subsequent parking space within the realm may have its number incremented by one. By such a varying optical character being present in each row, the processing system may be able to assign a unique identifier to each parking space based on analyzing the in-space optical characters and their relationship to each other within a parking row. In-space optical character 230-2 may be used in the same way to identify the fifth row within the parking lot. A learning engine of the wide-area parking space identification system may be able to interpolate that each row is assigned a consecutive letter, or, alternatively, the learning process may be performed when no parking spaces are occupied.

In some embodiments, different in-space characters may be used to differentiate types of parking spaces. For instance, a handicapped parking space may be designated with an "H", compact car parking spaces may be designated with a "C"; motorcycle spaces with an "M", etc. These characters may be read using the OCR engine and used in outputting indications of available parking spaces.

In some situations, the digital camera may be able to partially image an optical character within a parking space. Vehicle 220-3 only partially obscures in-space optical character 210-2. Whether the parking space is identified as available or unavailable may be based on the amount of optical character 210-2 that is obscured from the field of view of the digital camera. If in-space optical character 210-2 cannot be interpreted as the correct optical character (in this example, as a plus sign), it may be determined that the parking spaces are unavailable even though a portion of the optical character is visible. In other embodiments, the determination may be stored on the percent of the in-space optical character that is visible. For instance, if more than 50% of the in-space optical characters visible, it may be determined that the parking spaces are available. Such an occurrence may happen, for example, if debris is obscuring some of the instant's optical character. In the example of FIG. 2, vehicle 220-3 is a motorcycle and is thus smaller than a typical automobile and may tend to only obscure portion of in-space optical character 210-2.

Projected beams of light 250 may be projected by a directional illumination device, such as directional illumination device 140. Projected beams of light 250 may be projected into an aisle of a parking lot in front of an available parking space. Therefore, a driver may be able to easily identify an open parking space without travelling down the aisle in which beam 250-1 is projected. Rather, by traveling in direction 260 without going down aisles, a driver may be able to view beams of light 250 (e.g., beams 250-1 and 250-2) and learn of available parking spaces. In some embodiments, not every available parking space may be emphasized with an accompanying beam of light. For instance, an operator of a parking lot may only wish to emphasize particular parking spaces. Different colors of light being projected may emphasize different types of parking spaces. For instance, projected blue light may be used to emphasize handicapped designated parking spaces.

Figure 3:
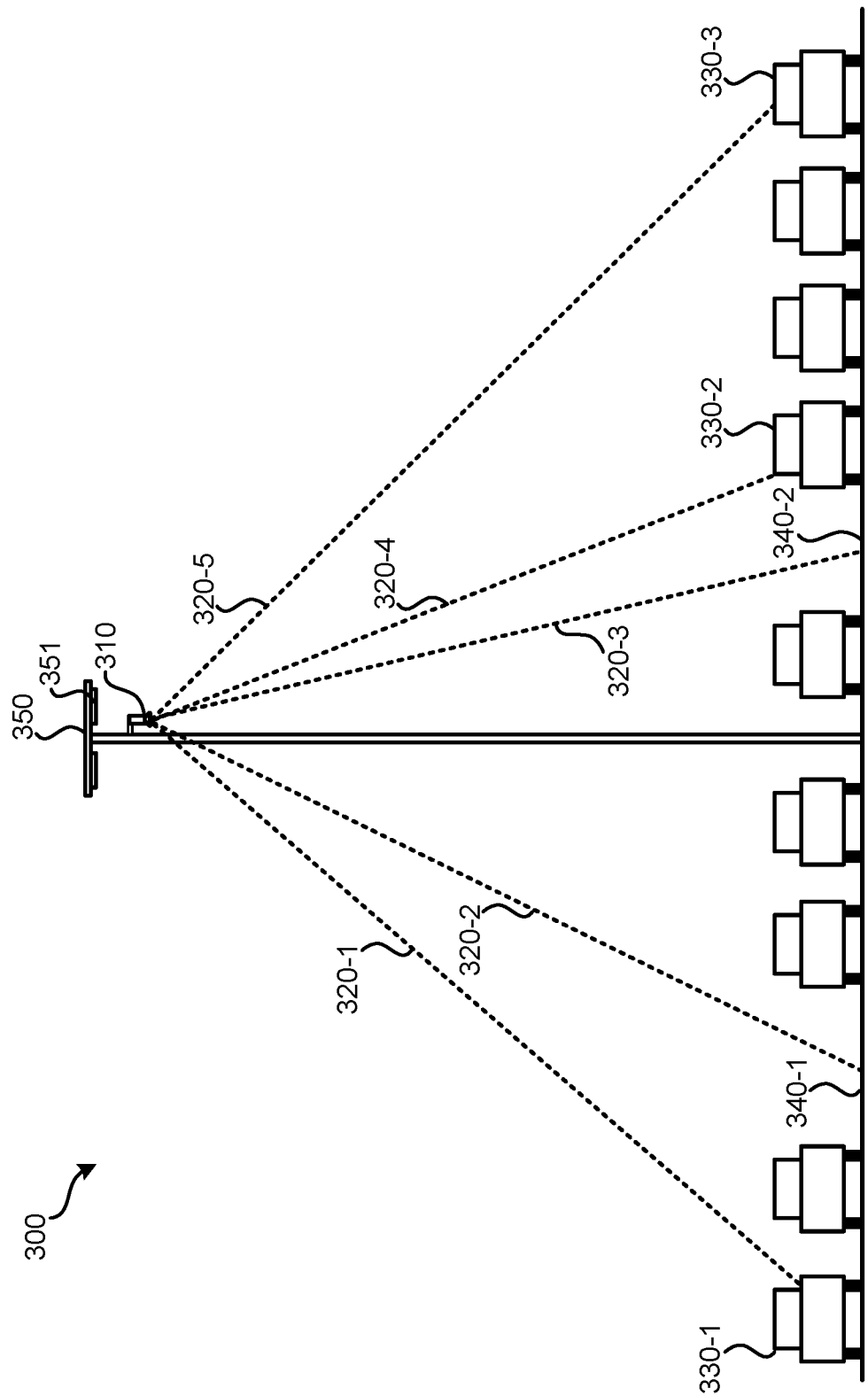
FIG. 3 illustrates a side view of a parking lot monitored by a wide-area parking space identification system.

FIG. 3 illustrates a side view of a parking lot 300 monitored by a wide-area parking space identification system. As can be seen in parking lot 300, digital camera 310 (which can represent an embodiment of digital camera 110 from system 100A or 100B), may be attached with light pole 350 which also supports lights 351. By digital camera 310 being elevated on light pole 350, lines of sight 320 are present to multiple parking spaces. Line of sight 320-1 to an in-space optical character is obscured by vehicle 330-1. Line of sight 320-2 to in-space optical character 340-1 is not obscured by any vehicle; therefore, the parking space is available. Line of sight 320-3 to in-space optical character 340-2 is not obscured by any vehicle; therefore, the parking space is available. Lines of sight 320-4 and 320-5 to in-space optical characters are obscured by vehicles 330-2 and 330-3; therefore, the parking spaces are not available.

Notably, the further a parking space is from the digital camera 310, the greater the angle, from vertical, of the line-of-sight from the digital camera to the in-space optical character. For instance, a greater angle is present for line-of-sight 320-1 than line-of-sight 320-2. To help prevent the in-space optical character from being obscured by a vehicle in a neighboring parking space, the greater the angle of the line-of-sight from vertical, the farther the in-space optical character may be offset from the center of the parking space towards a portion of the parking space away from digital camera 310. For instance, referring to FIG. 2, in-space optical character 210-3 is offset away from light pole 240 (towards the front line of the parking space); in-space optical character 210-4 is offset away from light pole 240 (towards the entrance of the parking space and to the right). A similar offset may be present for other in-space optical characters.

Figure 4:
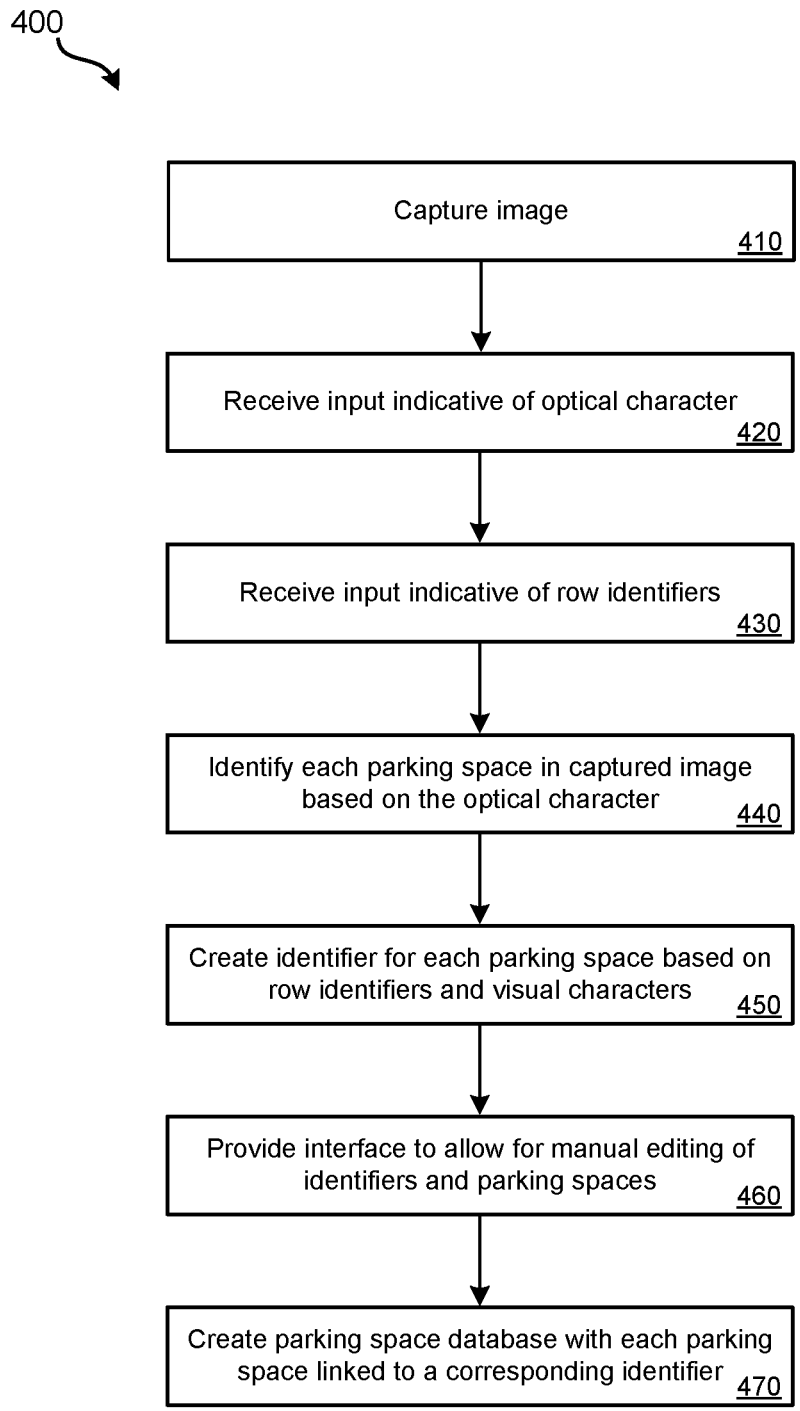
FIG. 4 illustrates a method for performing an initial calibration of a wide-area parking space identification system.

Various methods may be performed using the systems detailed in relation to FIGS. 1-3. FIG. 4 illustrates a method 400 for performing an initial calibration of a wide-area parking space identification system. Method 400 may be performed using training engine 121 of processing system 120. Therefore, each step of method 400 may be performed using a processing system which may reside in a housing with the digital camera that captures images of parking spaces or in a remote server system that is remotely located from the digital camera capturing images of parking spaces.

At block 410, an image may be captured using the digital camera that has multiple parking spaces within its field. The image captured at block 410 may be captured when no vehicles are present in the parking spaces that are to be monitored using the wide-area parking space identification system. When the image of block 410 is captured, in-space optical characters may already have been added to (e.g., painted within) the parking spaces and the digital camera may have been placed in a fixed location from which parking spaces will be monitored.

At block 420, input may be received that is indicative of the optical character that is to be detected within each parking space. This may include the one or more optical characters being input by a user into an interface of the processing system or selecting one or more instances of the optical character in the captured image. It should be understood that the optical character may be an alphanumeric character, a symbol, or graphic.

At block 430, row identifiers (or region identifiers), if present, may be identified. A row identifier may be an optical character that differs from the visual character associated with general parking spaces and may serve to distinguish a row (or region) within a parking area from other rows (or other regions). For instance, referring to FIG. 2, optical characters 230-1 and 230-2 may be examples of row identifiers. The row identifiers may be recognized by the learning engine within the image (e.g., based on user input that identifies the row identifier) or a user may manually identify the row identifier in each row (or region).

At block 440, each parking space in the captured image that has an optical character and/or a row identifier may be identified. For instance, a user may select a first of the optical characters from the image at block 420, then the learning engine of the processing system may select each other instance of the optical character present in the image at block 440. Alternatively, a user may select each instance of the optical character from the image at block 440. Similarly, parking spaces that have a row identifier may be identified.

At block 450, an identifier may be created for each parking space. The identifier may be based on the row identifier and the location of each parking space in relation to the row identifier and/or the position of the camera. For instance, referring to FIG. 2, row identifier "B" may be used to label each parking space in the row as B1-B12 from left to right. Each row visible in the camera's field-of-view may be similarly numbered. A unique identifier may be created for each parking space present within the camera's field of view. Each of these identifiers may be linked with a particular region of the image such that in future captured images, each visible optical character can be mapped to a unique parking identifier associated with the parking space.

At block 460, a user interface may be presented that allows a user to adjust or reassign parking space identifiers. A user may be able to correct misidentified parking spaces and/or reassign parking spaces to have different identifiers.

At block 470, a parking space database may be created that links the optical characters, row identifiers, unique parking space identifiers, and/or regions of the image. This database may be used to identify parking spaces available in future images in which an optical character is visible.

Figure 5:
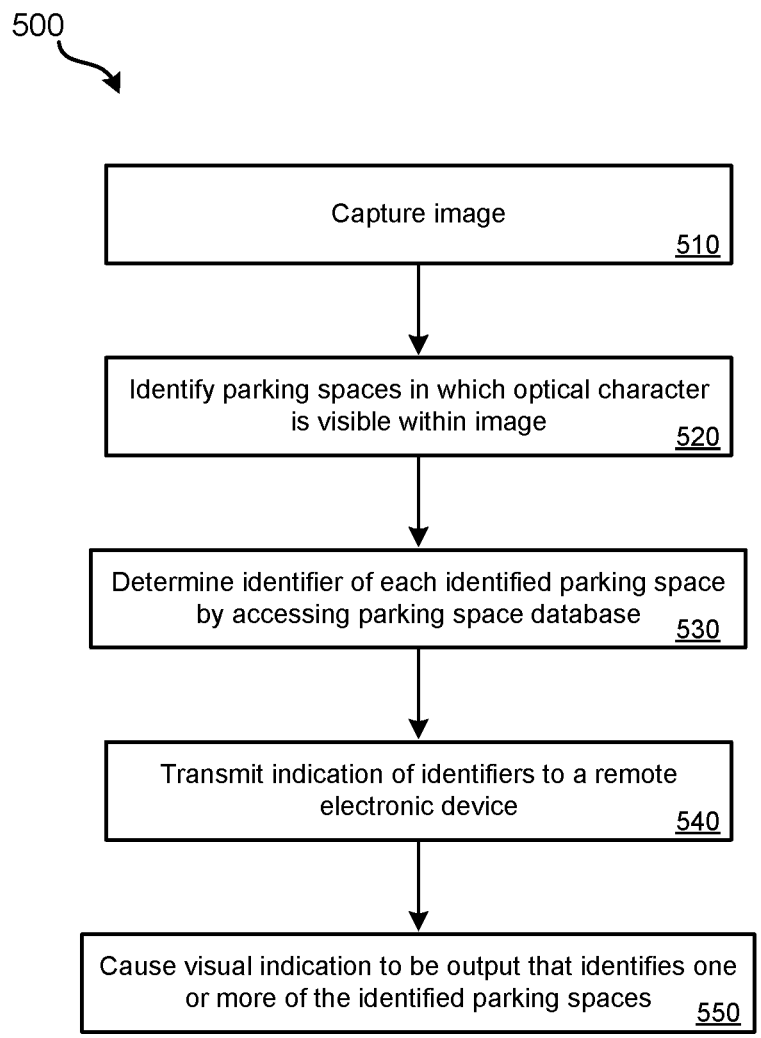
FIG. 5 illustrates a method for using a wide-area parking space identification system to identify available parking spaces.

FIG. 5 illustrates a method 500 for using a wide-area parking space identification system to identify available parking spaces. Method 500 may be performed using processing system 120 and, specifically, OCR engine 122, output engine 123, and parking space database 125. Parking space database 125 may have been created as part of method 400 of FIG. 4. Method 400 may be performed prior to method 500. Each step of method 500 may be performed using a processing system which may reside in a housing with the digital camera that captures images of parking spaces or in a remote server system that is remotely located from the digital camera capturing images of parking spaces.

At block 510, an image may be captured by the digital camera. This image may include various parking spaces, at least some of which are occupied by vehicles and at least one of which is available for parking. At block 520, parking spaces in which the designated optical character is readable by the OCR engine may be identified. If the in-space optical character can be correctly read within the parking space in the captured image, it is assumed that parking space is unoccupied and available. If the in-space optical character cannot be positively identified within the parking space, it may be assumed that the parking space is unavailable.

At block 530, a unique identifier associated with the identified optical character may be determined. This unique identifier may be based on the location within the image at which the optical character was identified. A parking space database may be accessed to determine a unique identifier linked with that region of the image. The unique identifier may identify the parking space.

At block 540, an indication of the one or more identified available parking spaces may be transmitted to a remote electronic device, such as a remote server system or some other remote electronic device. For instance, electronic signage may receive indications of available parking spaces at block 540 from the processing system. In some embodiments, at block 550 a visual indication, such as in the form of a beam of light, may be output onto the ground that identified one or more of the available parking spaces. This light may be projected to reflect off the ground a distance from the parking space such that a driver passing near the parking space can see the light reflect off the ground and be aware of the available parking space.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A wide-area parking space monitoring system comprising:
   a digital camera mounted to a raised structure, the digital camera having a field-of-view facing downward toward a plurality of parking spaces;
   a plurality of optical characters, wherein each optical character of the plurality of optical characters is painted on the ground within a corresponding parking space of the plurality of parking spaces;
   one or more processors;
   a memory communicatively coupled with and readable by the one or more processors and having stored therein processor-readable instructions which, when executed by the one or more processors, cause the one or more processors to:
      perform an initial calibration that maps each optical character of the plurality of optical characters visible in the field-of-view of the digital camera with the corresponding parking space of the plurality of parking spaces;
      capture, via the digital camera mounted with an outdoor light, an image facing downward toward the plurality of parking spaces;
      identify multiple optical characters that are visible within the image;
      determine multiple parking spaces of the plurality of parking spaces that are mapped to the identified multiple optical characters; and
      output an indication of the determined multiple parking spaces that indicates the multiple parking spaces are available to a directional illumination device; and
   the directional illumination device that projects an image outside each parking space of the determined multiple parking spaces that indicates that each of the determined multiple parking spaces is unoccupied, wherein the directional illumination device is mounted to the raised structure.

2. The wide-area parking space monitoring system of claim 1, wherein at least some of the optical characters of the plurality of optical characters differ from other optical characters of the plurality of optical characters.

3. The wide-area parking space monitoring system of claim 2, wherein the processor-readable instructions, when executed by the one or more processors, further cause the one or more processors to:
   create a unique identifier for each parking space of the plurality of parking spaces at least partially based on the plurality of optical characters.

4. The wide-area parking space monitoring system of claim 1, further comprising a housing, wherein the housing houses the digital camera, the memory, and the one or more processors.

5. The wide-area parking space monitoring system of claim 4, further comprising a wireless network interface, wherein the processor-readable instructions that cause the one or more processors to output the indication of the determined multiple parking spaces comprise processor-readable instructions configured to cause the one or more processors to transmit, via the wireless network interface, an identifier that corresponds to each parking space of the determined multiple parking spaces.

6. The wide-area parking space monitoring system of claim 5, wherein the wireless network interface communicates with a remote server system via a narrowband Internet of Things (NB-IoT) network.

7. The wide-area parking space monitoring system of claim 1, wherein the memory and one or more processors are part of a remote server that is remotely located from the digital camera.

8. The wide-area parking space monitoring system of claim 7, further comprising:
   a plurality of digital cameras comprising the digital camera, wherein each digital camera of the plurality of digital cameras is mounted with a different raised structure, wherein the one or more processors analyze images captured by each camera of the plurality of digital cameras.

9. The wide-area parking space monitoring system of claim 1, wherein the plurality of optical characters are offset from centers of the plurality of the parking spaces based on an angle of a line-of-sight from the digital camera to the corresponding parking space.

10. A wide-area parking space monitoring device comprising:
    a housing mounted to a raised structure;
    a digital camera, housed by the housing, the digital camera having a field-of-view facing downward toward a plurality of parking spaces, wherein present within the plurality of parking spaces is a plurality of optical characters, wherein a line-of-sight from each optical character of the plurality of optical characters to the digital camera is blocked when a vehicle is parked in a corresponding parking space of the plurality of parking spaces between the digital camera and the optical character;

one or more processors housed by the housing;

a memory, housed by the housing, communicatively coupled with and readable by the one or more processors and having stored therein processor-readable instructions which, when executed by the one or more processors, cause the one or more processors to:

perform an initial calibration that maps each optical character of the plurality of optical characters visible in the field-of-view of the digital camera with the corresponding parking space of the plurality of parking spaces;

capture, via the digital camera, an image facing downward toward the plurality of parking spaces;

identify multiple optical characters that are visible within the image;

determine multiple parking spaces of the plurality of parking spaces that are mapped to the identified one or more optical characters; and output an indication of the determined multiple parking spaces that indicates the multiple parking spaces are available to a directional illumination device; and the directional illumination device that projects an image outside each parking space of the determined multiple parking spaces that indicates that each of the determined multiple parking spaces is unoccupied, wherein the directional illumination device is mounted to the raised structure.

11. The wide-area parking space monitoring device of claim 10, wherein at least some of the optical characters of the plurality of optical characters differ from other optical characters of the plurality of optical characters.

12. The wide-area parking space monitoring device of claim 11 wherein the processor-readable instructions, when executed by the one or more processors, further cause the one or more processors to:

create a unique identifier for each parking space of the plurality of parking spaces at least partially based on plurality of optical characters.

13. The wide-area parking space monitoring device of claim 12, further comprising a wireless network interface housed within the housing, wherein the processor-readable instructions that cause the one or more processors to output the indication of the determined multiple parking spaces comprise processor-readable instructions configured to cause the one or more processors to transmit, via the wireless network interface, an identifier that corresponds to each parking space of the determined multiple parking spaces.

14. A method for using a wide-area parking space monitoring system, the method comprising:

performing, by the wide-area parking space monitoring system, an initial calibration that maps each optical character of a plurality of optical characters visible in a field-of-view of a digital camera of the wide-area parking space monitoring system with the corresponding parking space of a plurality of parking spaces, wherein the plurality of optical characters are painted on the ground within the plurality of parking spaces;

capturing, via the digital camera of the wide-area parking space monitoring system, an image facing downward toward the plurality of parking spaces;

identifying, by the wide-area parking space monitoring system, multiple optical characters that are visible within the image;

determining, by the wide-area parking space monitoring system, multiple parking spaces of the plurality of parking spaces that are mapped to the identified multiple optical characters;

outputting, by the wide-area parking space monitoring system, an indication of the determined multiple parking spaces that indicates the parking spaces that are available to a directional illumination device of the wide-area parking space monitoring system; and projecting, by the directional illumination device, an image outside each parking space of the determined multiple parking spaces that indicates that each of the determined multiple parking spaces is unoccupied.

15. The method for using the wide-area parking space monitoring system of claim 14, further comprising:

installing the plurality of optical characters such that an offset of each optical character of the plurality of optical characters is based on an angle of a line-of-sight from the digital camera to the corresponding parking space, wherein the offset is from a center of the corresponding parking space.

16. The method for using the wide-area parking space monitoring system of claim 14, further comprising:

creating a unique identifier for each parking space of the plurality of parking spaces at least partially based on plurality of optical characters.

17. The method for using the wide-area parking space monitoring system of claim 14, further comprising:

transmitting, by the wide-area parking space monitoring system via a wireless network interface, an identifier that corresponds to each parking space of the determined multiple parking spaces.

18. The method for using the wide-area parking space monitoring system of claim 17, wherein the wireless network interface communicates with a remote server system via a narrowband Internet of Things (NB-IoT) network.

* * * * *